United States Patent
Agace et al.

(10) Patent No.: US 9,685,248 B2
(45) Date of Patent: Jun. 20, 2017

(54) SNAP-IN INSERT FOR REACTIVITY CONTROL IN SPENT NUCLEAR FUEL POOLS AND CASKS

(71) Applicant: Holtec International, Inc., Marlton, NJ (US)

(72) Inventors: Stephen J. Agace, Marlton, NJ (US); Stephen E. Thompson, Bel Air, MD (US); John D. Griffiths, Deptford, NJ (US); Richard M. Springman, Drexel Hill, PA (US)

(73) Assignee: Holtec International, Inc.

( * ) Notice: Subject to any disclaimer, the term of this patent is extended or adjusted under 35 U.S.C. 154(b) by 854 days.

(21) Appl. No.: 13/925,585

(22) Filed: Jun. 24, 2013

(65) Prior Publication Data

US 2013/0343503 A1    Dec. 26, 2013

Related U.S. Application Data

(60) Provisional application No. 61/663,316, filed on Jun. 22, 2012.

(51) Int. Cl.

| | |
|---|---|
| *G21F 5/012* | (2006.01) |
| *G21C 19/07* | (2006.01) |
| *G21C 19/40* | (2006.01) |
| *G21F 1/06* | (2006.01) |
| *G21F 1/08* | (2006.01) |

(52) U.S. Cl.
CPC ............. *G21F 5/012* (2013.01); *G21C 19/07* (2013.01); *G21C 19/40* (2013.01); *G21F 1/06* (2013.01); *G21F 1/08* (2013.01)

(58) Field of Classification Search
CPC ........................................................ G21C 7/06

USPC ........................... 376/272; 250/518.1, 506.1
See application file for complete search history.

(56) References Cited

U.S. PATENT DOCUMENTS

| | | | |
|---|---|---|---|
| 5,479,463 A | 12/1995 | Roberts | |
| 5,629,964 A | 5/1997 | Roberts | |
| 5,841,825 A | 11/1998 | Roberts | |
| 6,442,227 B1 | 8/2002 | Iacovino, Jr. et al. | |
| 6,741,669 B2 * | 5/2004 | Lindquist ............... | G21C 19/40 376/272 |

(Continued)

OTHER PUBLICATIONS

ML080800477 excerpt pp. 1-45; full document is 152 pages. New and Spent Fuel Storage Racks for Calvert Cliffs Unit 3 U.S. EPR Topical Report. Holtec Report No. HI-2083956. Available online: Mar. 28, 2008 at <https://adamswebsearch2.nrc.gov/webSearch2/main.jsp?AccessionNumber=ML080800477>.*

(Continued)

*Primary Examiner* — Jack W Keith
*Assistant Examiner* — Lily C Garner
(74) *Attorney, Agent, or Firm* — The Belles Group, P.C.

(57) ABSTRACT

A neutron absorbing apparatus, for insertion into a fuel cell storage system, includes a corner spine, a first all and a second wall, each wall being affixed to the corner spine to form a chevron shape. Each wall includes an absorption sheet affixed to the corner spine, each absorption sheet being formed of a metal matrix composite having neutron absorbing particulate reinforcement, and a guide sheet affixed to and covering a fractional upper portion of the absorption sheet and extending over a top of the absorption sheet. The absorption sheet extends along the corner spine a greater length than the guide sheet.

17 Claims, 8 Drawing Sheets

(56) References Cited

U.S. PATENT DOCUMENTS

| | | | |
|---|---|---|---|
| 8,158,962 B1* | 4/2012 | Rosenbaum | G21C 19/07 |
| | | | 250/506.1 |
| 2011/0142189 A1* | 6/2011 | Foussard | G21C 19/07 |
| | | | 376/272 |

OTHER PUBLICATIONS

Precision Steel technical manual. 2008. pp. 51-56. Full version available online: <http://www.precisionsteel.com/media/files/PSW%20Tech%20Handbook.pdf>.*

* cited by examiner

SNAP-IN INSERT FOR REACTIVITY CONTROL IN SPENT NUCLEAR FUEL POOLS AND CASKS

CROSS REFERENCE TO RELATED APPLICATIONS

Priority is claimed to U.S. provisional patent application No. 61/663,316, filed Jun. 22, 2012, the disclosure of which is incorporated herein by reference in its entirety.

FIELD OF THE INVENTION

The field of the present invention relates to neutron absorbing apparatus and methods used to facilitate close packing, of spent nuclear fuel assemblies.

BACKGROUND OF THE INVENTION

Nuclear power plants currently store their spent fuel assemblies on site for a period after being removed from the reactor core. Such storage is typically accomplished by placing the spent fuel assemblies in closely packed fuel racks located at the bottom of on-site storage pools. The storage pools provide both radiation shielding and much needed cooling for the spent fuel assemblies.

Fuel racks often contain a large number of closely arranged adjacent storage cells wherein each cell is capable of accepting a spent fuel assembly. In order to avoid criticality, which can be caused by the close proximity of adjacent fuel assemblies, a neutron absorbing material is positioned within the cells so that a linear path does not exist between any two adjacent cells (and thus the fuel assemblies) without passing through the neutron absorbing material.

Early fuel racks utilized a layer of neutron absorbing material attached to the cell walls of the fuel rack. However, these neutron absorbing materials have begun to deteriorate as they have been submerged in water for over a decade. In order to either extend the period over which the fuel assemblies may be stored in these fuel racks, it is necessary to either replace the neutron absorber in the cell walls or to add an additional neutron absorber to the cell or the fuel assembly.

In an attempt to remedy the aforementioned problems with the deteriorating older fuel racks, the industry developed removable neutron absorbing assemblies, such as those disclosed in U.S. Pat. No. 5,841,825; U.S. Pat. No. 6,741,669; and U.S. Pat. No. 6,442,227. Neutron absorbing assemblies such as these have become the primary means by which adjacent fuel assemblies are shielded from one another when supported in a submerged fuel rack. Thus, newer fuel racks are generally devoid of the traditional layer of neutron absorbing material built into the structure of the fuel rack itself that can degrade over time. Instead, fuel assembly loading and unloading procedures utilizing neutron absorbing assemblies have generally become standard in the industry. In older racks, the neutron absorbing assemblies are added over the older, often degrading, layer of neutron absorbing material.

While the neutron absorbing assemblies disclosed in the prior art have proved to be preferable to the old fuel racks having the neutron absorbing material integrated into the cell walls, these neutron absorbing assemblies are less than optimal for a number of reasons, including without limitation complexity of construction, the presence of multiple welds, complicated securing mechanisms, and multi-layered walls that take up excessive space within the fuel rack cells. Additionally, with existing designs of neutron absorbing assemblies, the inserts themselves must be removed prior to or concurrently with the fuel assemblies in order to get the fuel assemblies out of the fuel rack. This not only complicates the handling procedure but also leaves certain cells in a potentially unprotected state.

SUMMARY OF THE INVENTION

The present invention is directed toward a neutron absorbing apparatus for insertion into spent fuel cell transport and/or storage systems.

In a first separate aspect of the present invention, a neutron absorbing apparatus includes a corner spine and first and second walls, each affixed to the corner spine to form a chevron shape. Each wall includes an absorption sheet and a guide sheet. The absorption sheet is formed from a metal matrix composite having neutron absorbing particulate reinforcement and is affixed to the corner spine. The guide sheet is affixed to and covers an upper portion of the absorption sheet, and it also extends over a top of the absorption sheet. The absorption sheet extends along the corner spine along a greater length than the guide sheet.

In a second separate aspect of the present invention, a neutron absorbing apparatus includes a corner spine and first and second walls, each affixed to the corner spine to form a chevron shape. Each wall includes an absorption sheet and a guide sheet. The absorption sheet is formed from a metal matrix composite having neutron absorbing particulate reinforcement and is affixed to the corner spine. The guide sheet is affixed to and covers an upper portion of the absorption sheet, and it also extends over a top of the absorption sheet. At least one of the walls also includes a locking protuberance coupled to the respective guide sheet and protruding through an opening formed in the respective absorption sheet.

In a third separate aspect of the present invention, a system for supporting spent nuclear fuel in a submerged environment includes a fuel rack, a fuel assembly, and a neutron absorbing apparatus. The fuel rack includes an array of cells, with each cell being separated from adjacent cells by a cell wall. The fuel assembly is positioned within one of the cells, and the neutron absorbing, apparatus is also disposed within that cell. The neutron absorbing apparatus includes a corner spine and first and second walls, each affixed to the corner spine to form a chevron shape. Each wall includes an absorption sheet and a guide sheet. The absorption sheet is formed from a metal matrix composite having neutron absorbing particulate reinforcement and is affixed to the corner spine. The guide sheet is affixed to and covers an upper portion of the absorption sheet, and it also extends over a top of the absorption sheet. At least one of the cell wall in which the fuel assembly is disposed, adjacent the first wall or the second wall of the neutron absorbing apparatus, and the first wall or the second wall include a locking protuberance positioned to retain the neutron absorbing apparatus in the first cell during removal of the fuel assembly from the first cell.

In a fourth separate aspect of the present invention, a method of retrofitting a spent nuclear fuel cell storage system includes inserting a neutron absorbing apparatus into one cell of an array of cells, wherein each cell is separated from each adjacent cell by a cell wall. The neutron absorbing apparatus includes a corner spine and first and second walls, each affixed to the corner spine to form a chevron shape. Each wall includes an absorption sheet and a guide sheet.

The absorption sheet is formed from a metal matrix composite having neutron absorbing particulate reinforcement and is affixed to the corner spine. The guide sheet is affixed to and covers an upper portion of the absorption sheet, and it also extends over a top of the absorption sheet. At least one of the walls also includes a first locking protuberance coupled to the respective guide sheet and protruding through an opening formed in the respective absorption sheet. The method further includes creating a second locking protuberance in a first cell wall adjacent the neutron absorbing apparatus, wherein the first locking protuberance and the second locking protuberance are positioned to interlock to retain the neutron absorbing apparatus in the one cell.

In a fifth separate aspect of the present invention, any of the foregoing aspects may be employed in combination.

Accordingly, an improved neutron absorption apparatus for spent nuclear fuel pools and casks is disclosed. Advantages of the improvements will be apparent from the drawings and the description of the preferred embodiment.

BRIEF DESCRIPTION OF THE DRAWINGS

The foregoing summary, as well as the following detailed description of the exemplary embodiments, will be better understood when read in conjunction with the appended drawings. It should be understood, however, that the invention is not limited to the precise arrangements and instrumentalities shown in the following figures.

DETAILED DESCRIPTION OF PREFERRED EMBODIMENTS

Figure 1:
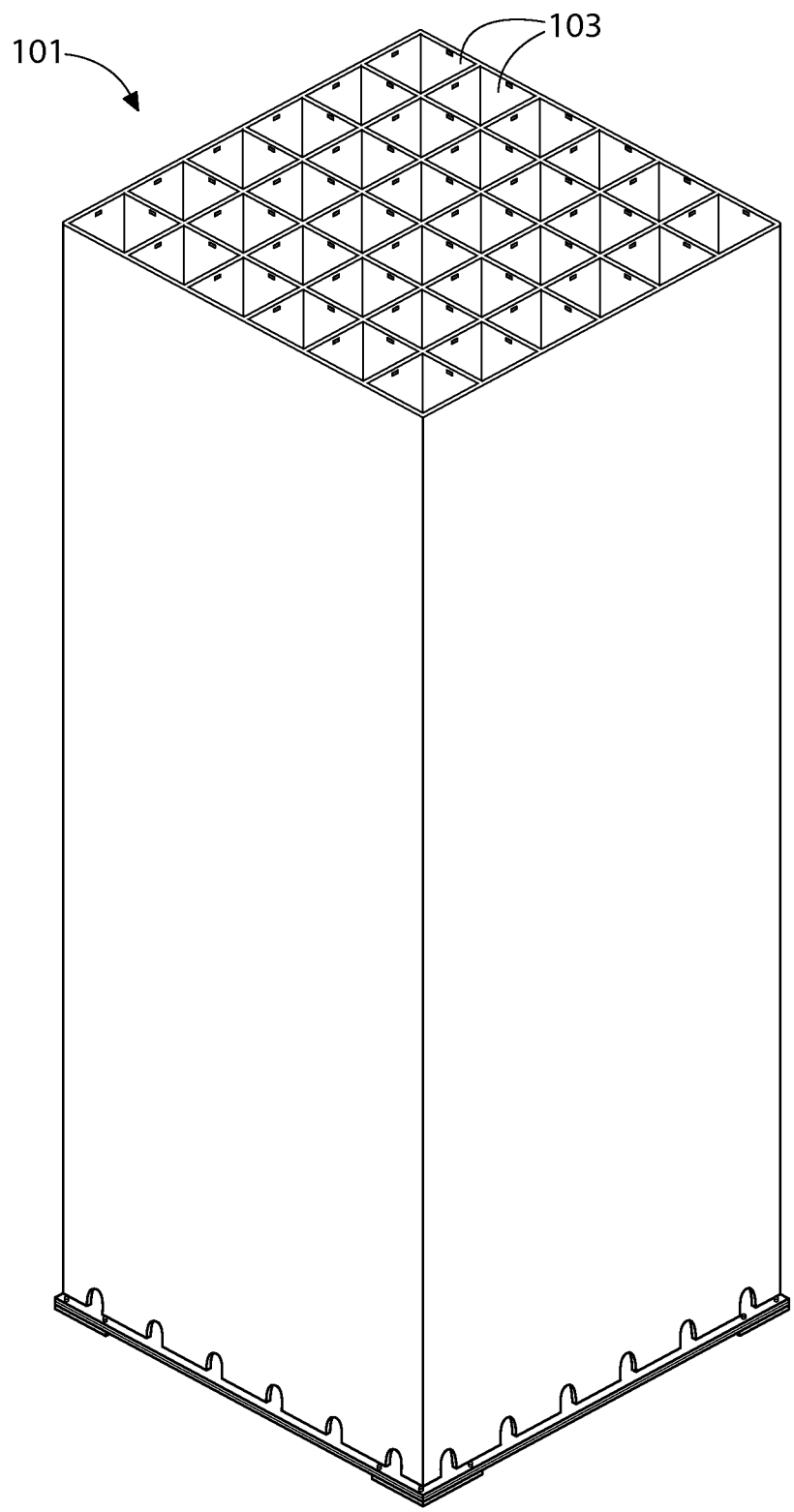
FIG. 1 illustrates a fuel rack having an array of cells to receive fuel assemblies containing spent nuclear fuel.

The description of illustrative embodiments according to principles of the present invention is intended to be read in connection with the accompanying drawings, which are to be considered part of the entire written description, in the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "left," "right," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting, combinations of features that may exist alone or in other combinations of features, the scope of the invention being defined by the claims appended hereto.

Turning in detail to the drawings, FIG. 1 shows a fuel rack 101 having an array of cells 103 into which spent nuclear fuel assemblies may be inserted. The fuel rack 101 may be part of a submerged storage system for spent nuclear fuel, or it may be part of a transportation system for spent nuclear fuel, such as dry or wet spent fuel casks. As shown, the cell walls include a feature for interlocking with a locking protuberance included as part of a neutron absorbing assembly inserted, into one or more of the cells. This feature may be a complementary locking protuberance, or a complementary receptacle to receive the locking protuberance of the neutron absorbing assembly. The feature may be created by bending, punching, welding, riveting, or otherwise permanently deforming the cell walls of the rack or the fuel cask, or by securing attachments to the cell walls, for holding the absorption assembly in place once it is inserted into the fuel cell.

In some embodiments, if the fuel rack 101 has too small of a cell opening to accommodate thickness of the fuel insert, the insert may be directly inserted into the guide tubes of the fuel assembly.

FIGS. 2-5 show a neutron absorbing assembly 111 which may be used in conjunction with both PWR or BWR storage requirements. The neutron absorbing assembly 111 is configured to be slidably inserted at strategic locations within the cell array of a submerged fuel rack. However, the absorbing assembly can be used in any environment (and in conjunction with any other equipment) where neutron absorption is desirable. Furthermore, based on the disclosed process for bending a metal matrix composite having neutron absorbing particulate reinforcement for the resulting angled plate structure), an absorbing assembly may be configured for use in any environment and/or used to create a wide variety of structures, including without limitation fuel baskets, fuel racks, sleeves, fuels tubes, housing structures, etc.

The neutron absorbing assembly 111 includes a corner spine 113, to which are fastened two walls 115 to form a chevron-shaped structure (when viewed from the top or bottom). For a cell with a square cross-sectional configuration, the corner spine 113 creates a relative angle between the two walls 115 of about 90 degrees. Other relative angles may also be used, primarily depending upon the cross-sectional configuration of the cell into which the neutron absorbing assembly 111 is to be inserted (e.g, triangular, pentagonal, hexagonal, etc.). Each wall has an absorption sheet 117, constructed from a neutron absorbing material, and a guide sheet 119. Since the walls may be mirror images of each other, the following addresses the configuration of only one of the walls, with the understanding that the second wall may be similarly configured. However, in one embodiment, one of the walls includes a locking feature, and one does not. In other embodiments, both walls include a locking feature. In certain embodiments, additional corner spines and walls may be added to provide neutron absorption on more than two sides of a cell.

The absorption sheet 117 is affixed to and extends much the length of the corner spine 113, and it may extend the entire length or only part of the length, depending upon the requirements for neutron absorption within the cell, e.g., the linear space within the cell occupied by the spent fuel rods. The absorption sheet 117 may be affixed to the corner spine 113 using any suitable fastener, such as rivets. The bottom edge 118 of the absorption sheet 117 has a skewed shape to facilitate ease of insertion of the neutron absorbing assembly 111 into a cell of a fuel rack. Specifically, the bottom edge 118 of the absorption sheet 117 tapers upward and away from the corner spine 113.

Figure 2:
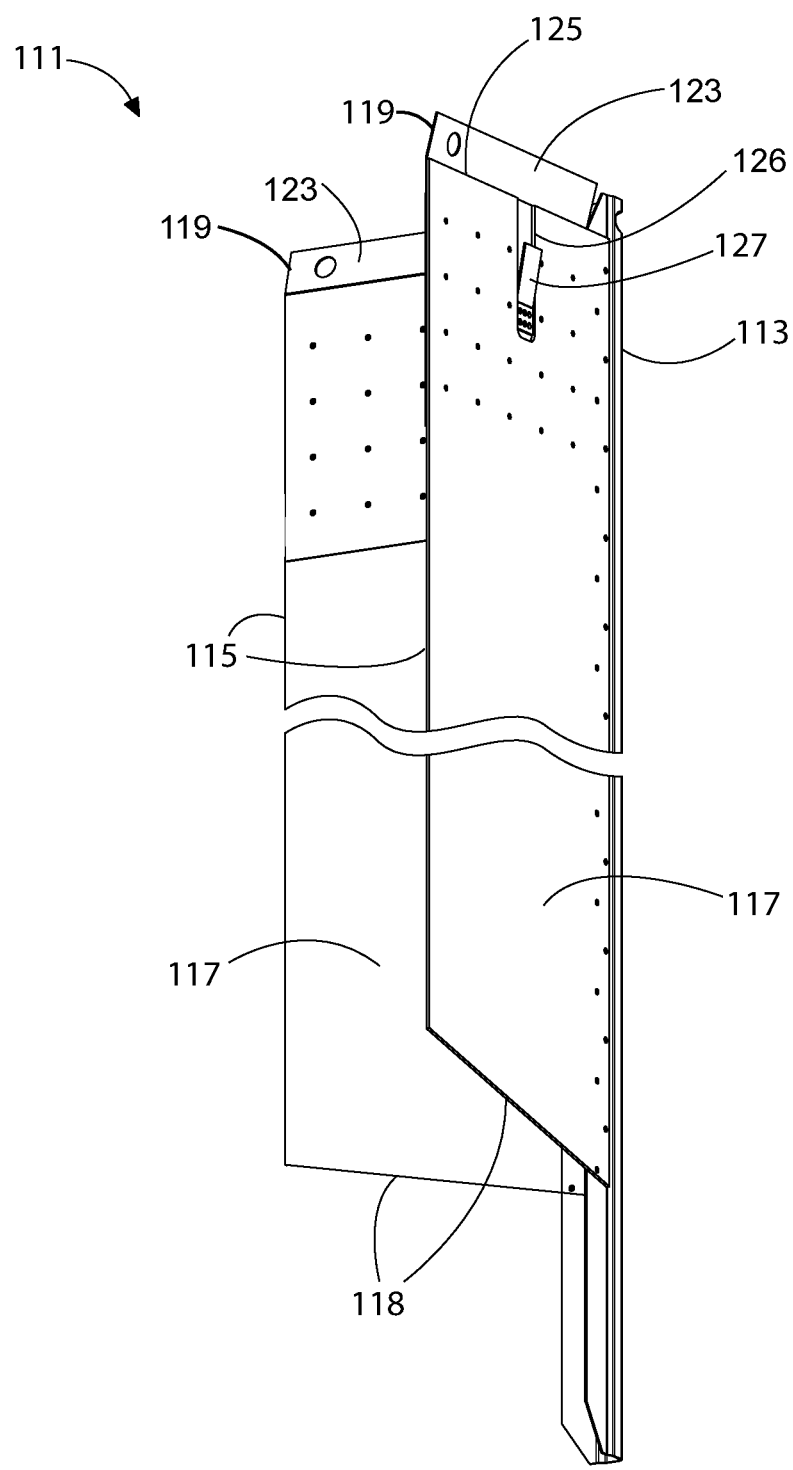
FIG. 2 is a perspective view of a neutron absorbing apparatus.
Figure 3:
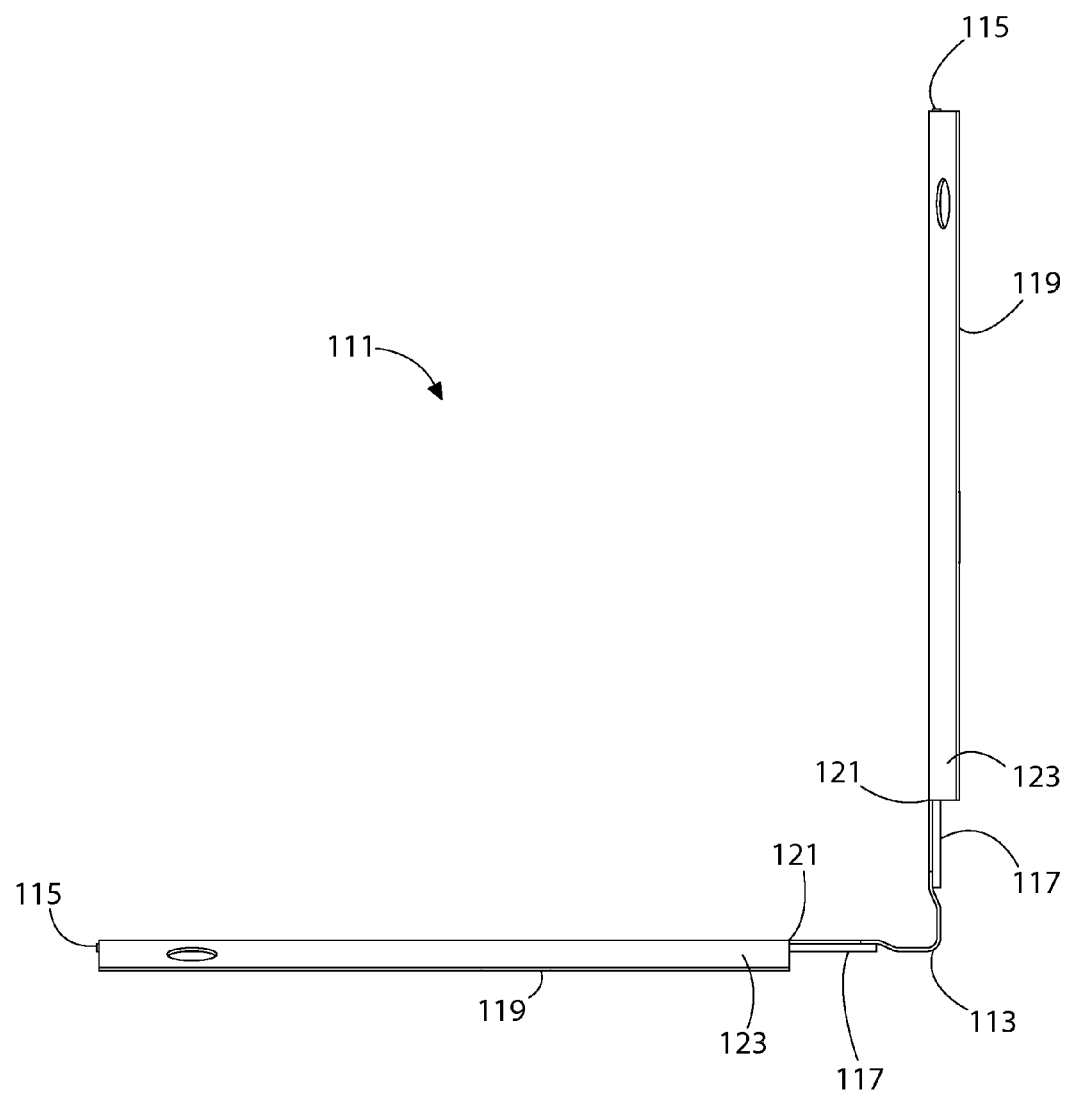
FIG. 3 is a top elevation view of the neutron absorbing apparatus of FIG. 1.
Figure 4:
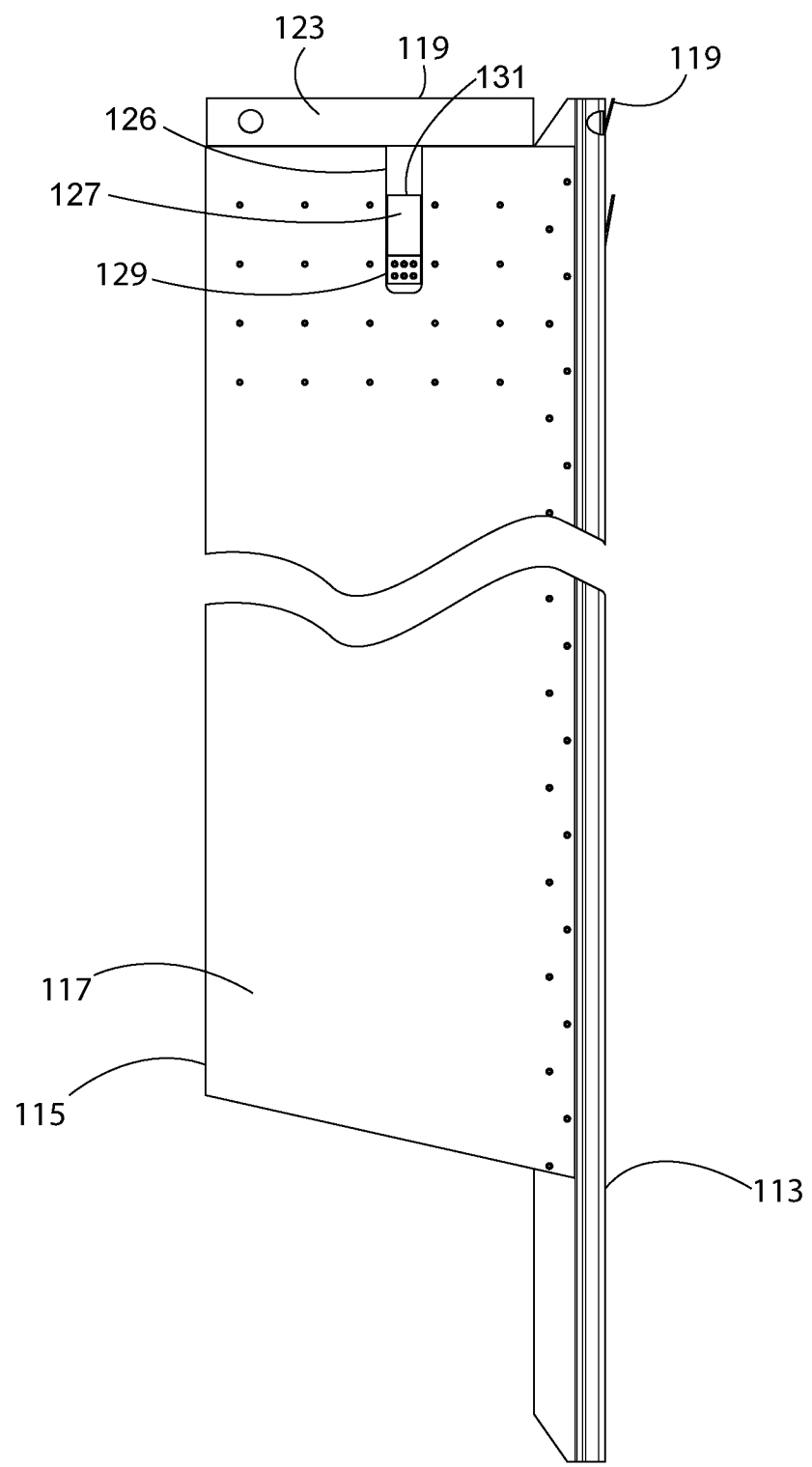
FIG. 4 is a side view of the neutron absorbing apparatus of FIG. 1.

The guide sheet 119 is affixed to only a top portion of the absorption sheet 117 by suitable fasteners, such as rivets, and the guide sheet 119 extends along less of a length of the corner spine 113 than the absorption sheet 117. The edge of the guide sheet 119 abuts up against the edge of the corner spine 113 along a common edge 121 to help reduce the overall thickness of the assembly. As shown in FIG. 2, the absorption sheet extends along most of the length of the corner spine 113, and the guide sheet 113 extends along a short top portion of the corner spine 113. The difference in lengths reflects the difference in functions between the absorption sheet 117 and the guide sheet 119. Where the absorption sheet 117 is included for neutron absorption, the guide sheet 119 is included, at least to aid in guiding a spent nuclear fuel assembly into the cell after the absorption assembly 111 is in place within the cell, to protect the top edge of the absorption assembly from damage, to provide a support surface for a locking protuberance, and to provide a structure by which the absorption assembly 111 may be supported during installation into the cell.

The guide sheet 119 also includes an extension portion 123 which extends over and above the top edge 125 of the absorption sheet 117. This extension portion 123 provides a surface to aid in guiding a spent fuel assembly into a cell in which the absorption assembly is 111 placed. The extension portion 123 also protects the top edge 125 of the absorption sheet 117 from damage during the process of loading a spent fuel assembly into the cell.

The top portion of each absorption sheet 117 includes a cut-out 126, and a tab 127 (which is a locking protuberance in the embodiment shown) extends from the guide sheet 119, through the cut-out 126, and beyond the outer surface of the absorption sheet 117. The tab 127 includes a lower part 129 affixed to the guide sheet, using any suitable fastener, such as rivets, and an upper part 131 which is bent away from the guide sheet 119 to extend through the cut-out 126. A locking protuberance may be formed in any other manner to provide the same locking functionality as described in connection with the tab herein. In addition, a locking protuberance may be included on both the absorption assembly 111 and the cell wall (See FIG. 6), or in other embodiments it may be included on only one of the absorption assembly 111 and the cell wall.

Figure 5:
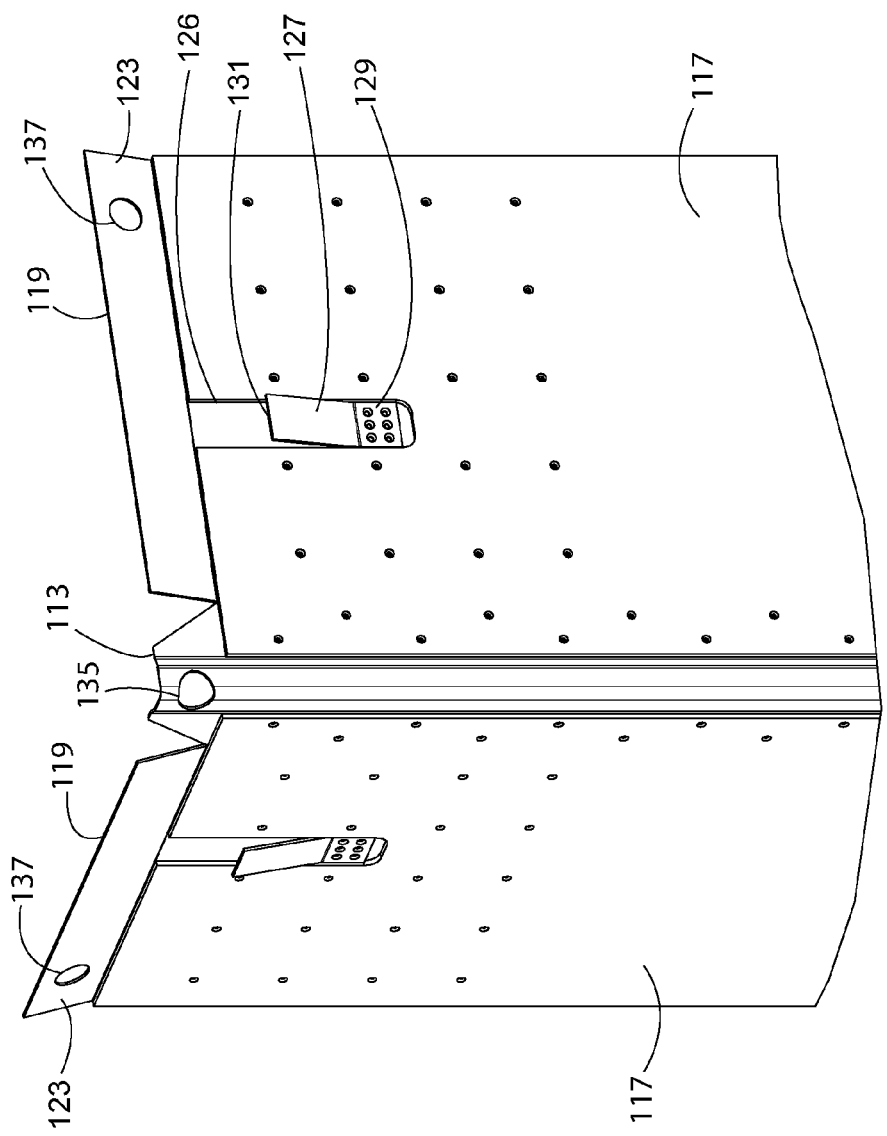
FIG. 5 is partial perspective view of the upper rear portion of the neutron absorbing apparatus of FIG. 1.

As seen in FIG. 5, one suspension aperture 135 is included at the top of the corner spine 113, and one suspension aperture 137 is included in the extension portion 123 of each guide sheet 119. These suspension apertures 135, 137 are included to facilitate robotically placing the absorption assembly 111 in a cell within a submerged storage system. The shape and positioning of the suspension apertures is a matter of design choice.

Figure 6:
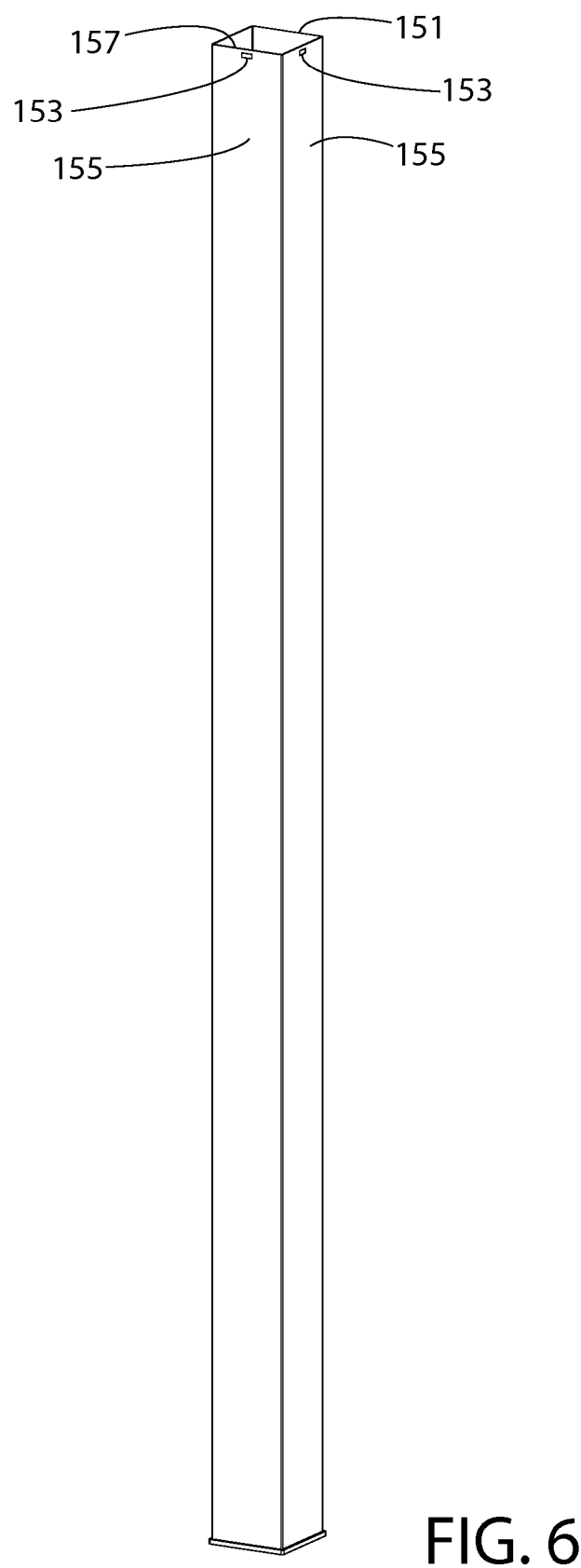
FIG. 6 is a perspective view of one cell in a fuel rack, wherein multiple adjacent cells would form an array of cells for the fuel rack.

A single cell 151 for receiving a spent nuclear fuel assembly and an absorption assembly is shown in FIG. 6. Two walls of the cell 151 each include a feature 153 near the top of the cell wall 155, and the feature 153 is configured to engage the absorption assembly to retain the absorption assembly when the spent nuclear fuel assembly is removed from the cell. This feature 153 may be an indentation, a cut-out, or a protuberance, depending upon what type of corresponding locking, feature is included on the absorption assembly. The type of feature and its configuration are a matter of design choice.

Figure 7:
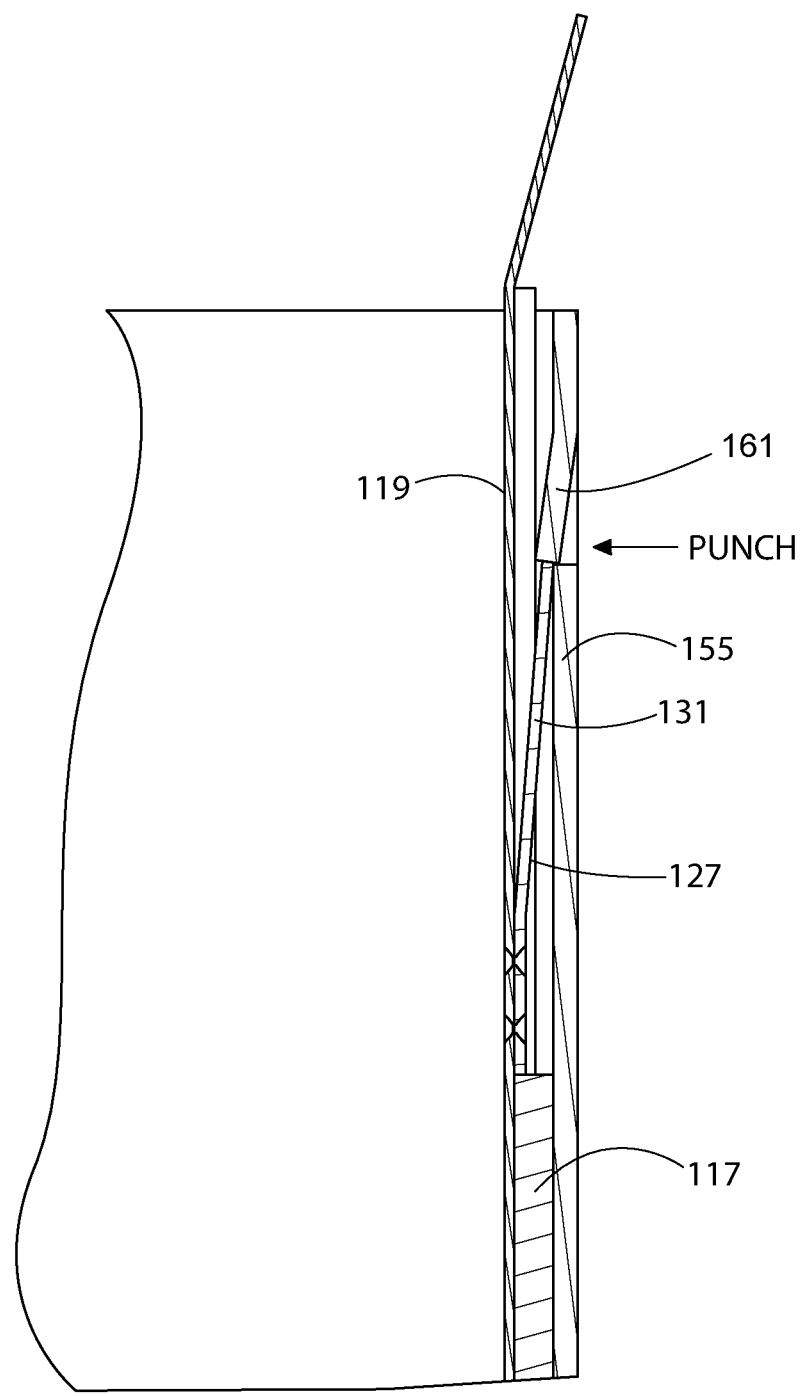
FIG. 7 is a cross sectional view of the interlocking engagement between the neutron absorbing apparatus of FIG. 1 fully inserted into the cell of FIG. 6.

A detailed cross-sectional view of the locking features of the absorption assembly 111 and the cell 151 are shown in FIG. 7. As described above, the locking feature may be a tab, and such a tab 127 is shown with its top portion 131 in locking engagement with a second tab 161, this second tab 161 being formed in the cell wall 155.

When manufacturing the absorption assembly for a fuel rack that has not yet been placed in service the order of making the locking protuberances, the type of locking protuberance used, and even whether one or both of the cell wall and the absorption assembly include a locking protuberance, are anticipated to be variables that may be addressed by design decisions for a particular configuration. However, when retrofitting a fuel rack or cask that is already in use, and a tab is used in the cell wall as a locking protuberance, preferably the absorption assembly is first manufactured and placed into the cell before the tab in the cell wall is created. This permits maximization of space use within a pool or cask by minimizing the space requirements of the absorption assembly, because the tab effectively reduces the overall nominal width of the cell.

When retrofitting an existing and in-use fuel rack or cask, the tab 161 in the cell wall may be formed just above the position of the tab in the absorption assembly as a half-shear using a C-shaped tool which spans the extension portion 123 of the guide sheet 119. With such a tool, a double-acting hydraulic cylinder may be used to push a wedge-shaped piece of the tool into the cell wall, thereby creating the half-sheared tab 161 extending toward the inner space of the cell.

Figure 8:
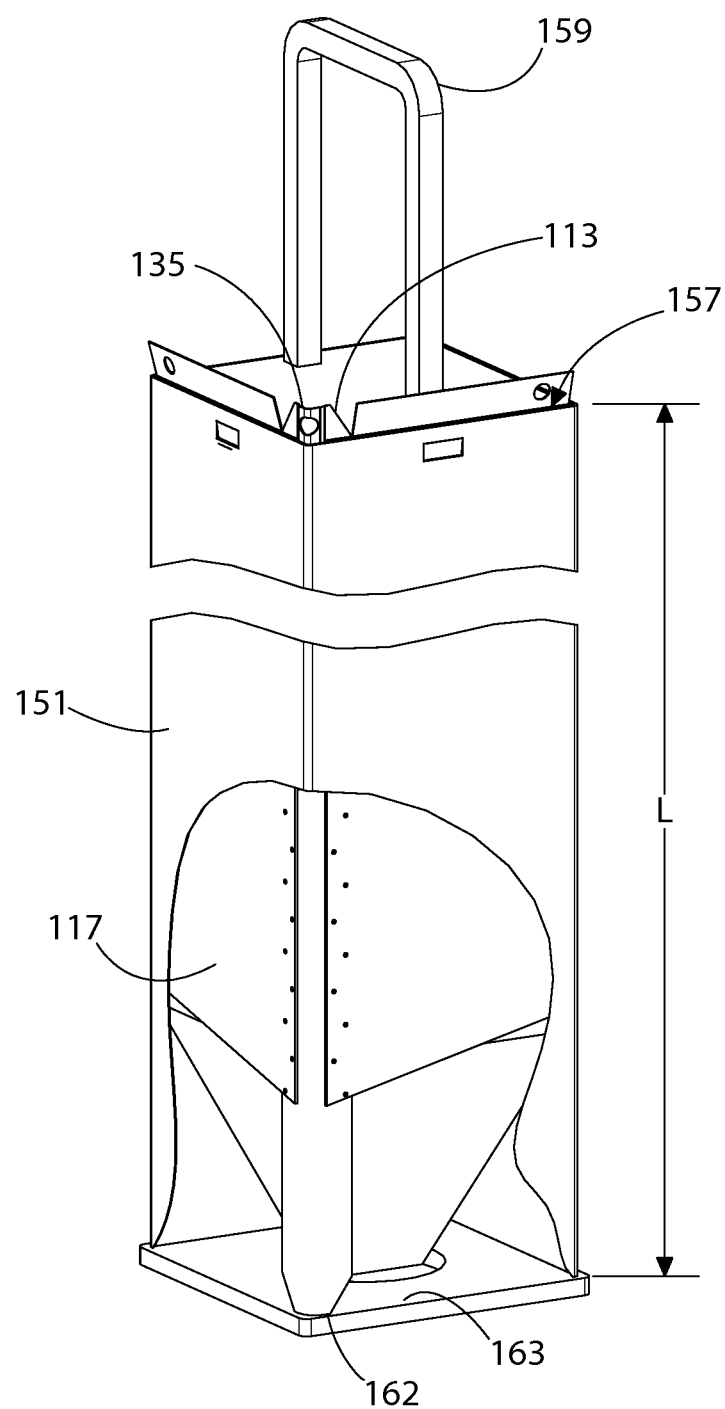
FIG. 8 is a perspective view of a fuel assembly in a cell that is part of an array of cells in a submerged fuel rack, and a fully inserted neutron absorbing apparatus.

The cell 151 has an overall length L, and the corner spine is configured to have approximately the same length, as shown in FIG. 8. As shown, the corner spine 113 clears the top 157 of the cell by a sufficient amount to make the suspension aperture 135 of the corner spine 113 accessible, even when the spent nuclear fuel assembly 159 is placed within the cell 151. The length of the corner spine 113 is such that the bottom edge 162 rests against the bottom 163 of the cell 151. The absorption sheet 117 need not extend all the way to the bottom 163 of the cell 151, as the length of the absorption sheet 117 may extend as far down into the cell as needed so that it shields adjacent fuel assemblies from one another. This is because adjacent spent nuclear fuel rods may not extend the entire length of the cell either, and the length of the absorption sheet 117 need only be as long as the spent nuclear fuel rods within the spent nuclear fuel assembly 159, although they may be longer if desired.

Since there is a need to maximize space use within a fuel pond or cask, it is desirable that the absorption assembly 111 take up as little room as possible in the cell of the fuel rack. To this end, the absorption sheets 117 are preferably constructed of an aluminum boron carbide metal matrix composite material having a percentage of boron carbide greater than 25%. While the addition of boron carbide particles to the aluminum matrix alloy increases the ultimate tensile strength, increases yield strength, and dramatically improves the modulus of elasticity (stiffness) of the material, it also results in a decrease in the ductility and fracture toughness of the material compared to monolithic aluminum alloys.

The boron carbide aluminum matrix composite material of which the absorption sheets are constructed includes a sufficient amount of boron carbide so that the absorption sheets can effectively absorb neutron radiation emitted from a spent fuel assembly, and thereby shield adjacent spent fuel assemblies in a fuel rack from one another. The absorption sheets may be constructed of an aluminum boron carbide metal matrix composite material that is about 20% to about 40% by volume boron carbide. Of course, other percentages may also be used. The exact percentage of neutron absorbing particulate reinforcement which is in the metal matrix composite material, in order to make an effective neutron absorber for an intended application, will depend on a number of factors, including the thickness (i.e., gauge) of the absorption sheets 117, the spacing between adjacent cells within the fuel rack, and the radiation levels of the spent fuel assemblies.

Other metal matrix composites having, neutron absorbing particulate reinforcement may also be used. Examples of such materials include, without limitation, stainless steel boron carbide metal matrix composite. Of course, other metals, neutron absorbing particulate and combinations thereof may be used including without limitation titanium (metal) and carborundum (neutron absorbing, particulate). Suitable aluminum boron carbide metal matrix composites are sold under the trade names Metamic® and Boralyn®.

The center spine, the guide sheets, and the locking protuberance may be formed from steel or other materials, or they may alternatively be formed from nonmetallic materials.

When the locking protuberance is configured as a tab affixed to the guide sheet of the absorption assembly, the tab is preferably formed from a sheet of 301 stainless spring steel, tempered to about 3/4 hard. In a preferred embodiment, the tab is about 0.035 inches thick, about 0.7 inches wide, and about 1.7 inches long, with the upper portion of the tab being about 1.09 inches long and bent to extend beyond the outer side of the absorption layer by between 0.125 inches to 0.254 inches, depending upon how thick the absorption layer is and whether the absorption assembly is being placed over an existing absorption layer within the cell. In the latter instance, the tab should be configured so that the upper portion extends beyond the existing absorption layer. The extent to which the tab extends beyond the absorption layer is a matter of design choice, as it depends upon several factors such as the type of locking feature included on the cell wall, how much the tab needs to deflect upon insertion, and how much removal force the tab should be able to withstand. For example, with a tab extending 0.125 inches beyond the absorption layer, it may be desirable to have the tab be able to deflect by approximately 0.124 inches upon insertion. Such a configuration is anticipated to withstand at least a 200 lb removal force once the tab is interlocked with a second tab formed in the cell wall. It should be noted that the tab will remain in a substantially deflected state once the absorption assembly is inserted into cell wall.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A neutron absorbing apparatus for insertion into a fuel cell storage system, the apparatus comprising:
   a corner spine;
   a first wall and a second wall, each affixed to the corner spine to form a chevron shape, wherein each wall comprises:
      an absorption sheet comprising a metal matrix composite having neutron absorbing particulate reinforcement, the absorption sheet extending along a longitudinal axis from a top edge to a bottom edge and having a first planar surface and a second planar surface that extend between the top and bottom edges; and
      a guide sheet having a first surface and an opposite second surface, the guide sheet affixed to the absorption sheet so that the first surface of the guide sheet covers a portion of the first planar surface of the absorption sheet, the guide sheet extending longitudinally beyond the top edge of the absorption sheet, wherein the absorption sheet extends along the corner spine along a greater length than the guide sheet; and
   wherein at least one of the first and second walls comprises a cutout extending through the absorption sheet between the first and second planar surfaces from the top edge downwardly towards the bottom edge and a locking protuberance having a first portion coupled to the first surface of the guide sheet and a second portion obliquely angled relative to the first portion to extend from the first surface of the guide sheet and protrude into the cutout in the absorption sheet.

2. The apparatus of claim 1, wherein the locking protuberance is resiliently deflective by about 0.125 inch.

3. The apparatus of claim 1, wherein the locking protuberance protrudes past the second planar surface of the absorption sheet by between about 0.125 inch to 0.254 inch.

4. The apparatus of claim 1, wherein the locking protuberance comprises a tab.

5. The apparatus of claim 1, wherein the locking protuberance is formed from 301 stainless steel, tempered to 3/4 hard.

6. A neutron absorbing apparatus for insertion into a fuel cell storage system, the apparatus comprising:
   a corner spine; and
   a first wall and a second wall, each affixed to the corner spine to form a chevron shape, wherein each wall comprises:
      an absorption sheet affixed to the corner spine, the absorption sheet comprising a metal matrix composite having neutron absorbing particulate reinforcement; and
      a guide sheet affixed to the absorption sheet, the guide sheet extending over a top of the absorption sheet, and
   wherein at least one of the first wall and the second wall further comprises a locking protuberance having a first portion coupled to a first surface of the respective guide sheet and a second portion extending from the first surface of the respective guide sheet and terminating in a free end, the second portion of the locking protuberance protruding through an opening formed in the respective absorption sheet, a distance between the first surface of the respective guide sheet and the second portion of the locking protuberance continuously increasing from the first portion of the locking protuberance towards the free end of the second portion of the locking protuberance.

7. The apparatus of claim 6, wherein the guide sheet is affixed to and covers a fractional upper portion of the absorption sheet.

8. The apparatus of claim 6, wherein each locking protuberance comprises a tab.

9. The apparatus of claim 8, wherein the tab is formed from 301 stainless steel, tempered to 3/4 hard.

10. The apparatus of claim 6, wherein each locking protuberance is resiliently deflective by about 0.125 inch.

11. The apparatus of claim 6, wherein each locking protuberance protrudes past an outer surface of the absorption sheet by between about 0.125 inch to 0.254 inch.

12. The apparatus of claim 1, wherein for each of the first and second wall, the guide sheet comprises a planar portion and an extension portion, the extension portion being angled relative to the planar portion towards the absorption sheet, the planar portion affixed to the portion of the first planar surface of the absorption sheet and the extension portion extending over the top edge of the absorption sheet so that a longitudinal plane that includes the second planar surface of the absorption sheet intersects the extension portion of the guide sheet.

13. The apparatus of claim 1, wherein the corner spine and the guide sheets of the first and second walls are formed from a different material than the absorption sheets of the first and second walls.

14. The apparatus of claim 1, wherein the corner spine, the guide sheets of the first and second walls, and the absorption sheets of the first and second walls are formed as separate and distinct parts.

15. The apparatus of claim 6, wherein for each of the first and second wall, the absorption sheet comprises a top edge and a planar front surface extending along the corner spine, and the guide sheet is affixed to and covers the planar front surface within an upper portion of the absorption sheet and extends over the top edge of the absorption sheet.

16. The apparatus of claim 6, wherein the corner spine and the guide sheets of the first and second walls are formed from a different material than the absorption sheets of the first and second walls.

17. The apparatus of claim 6, wherein the corner spine, the guide sheets of the first and second walls, and the absorption sheets of the first and second walls are formed as separate and distinct parts.

\* \* \* \* \*